United States Patent [19]

Baffes

[11] Patent Number: 4,920,487

[45] Date of Patent: Apr. 24, 1990

[54] METHOD OF UP-FRONT LOAD BALANCING FOR LOCAL MEMORY PARALLEL PROCESSORS

[75] Inventor: Paul T. Baffes, Houston, Tex.

[73] Assignee: The United States of America as represented by the Administrator of the National Aeronautics and Space Administration, Washington, D.C.

[21] Appl. No.: 283,106

[22] Filed: Dec. 12, 1988

[51] Int. Cl.[5] .................... G06F 9/46; G06F 15/16
[52] U.S. Cl. ........................... 364/300; 364/228.3; 364/231.9; 364/280; 364/281
[58] Field of Search ... 364/200 MS File, 900 MS File, 364/300

[56] References Cited

U.S. PATENT DOCUMENTS

| | | | |
|---|---|---|---|
| 4,400,768 | 8/1983 | Tomlinson | 364/200 |
| 4,410,944 | 10/1983 | Kronies | 364/200 |
| 4,468,736 | 8/1984 | DeSantis et al. | 364/200 |
| 4,491,932 | 1/1985 | Ruhman et al. | 364/900 |
| 4,495,570 | 1/1985 | Kitajima et al. | 364/200 |
| 4,590,555 | 5/1985 | Bourrez | 364/200 |
| 4,633,387 | 12/1985 | Hartung et al. | 364/200 |

OTHER PUBLICATIONS

"Design of a Neural Network Simulator on a Transputer Array", by Gary McIntire, James Villarreal, Paul Baffes, & Monica Rua presented at Space Operations-Automation and Robotics Workshop 87, NASA/Johnson Space Center, Houston, TX, 8/5–7/87.

"Performance Tradeoffs in Static and Dynamic Load Balancing Strategies," by M. Ashraf Igbal, Joel G. Saltz and Shahid H. Bokhari, Institute for Computer Applications in Science and Engineering, NASA Langley Research Center, Hampton, Va. 23665, Mar. 1986.

*Primary Examiner*—Raulfe B. Zache
*Attorney, Agent, or Firm*—Hardie R. Barr; John R. Manning; Edward K. Fein

[57] ABSTRACT

In a parallel processing computer system with multiple processing units and shared memory, a method is disclosed for uniformly balancing the aggregate computational load in, and utilizing a minimal memory by, a network having identical computations to be executed at each connection therein. Read-only and read-write memory are subdivided into a plurality of partitions, and the computational load is subdivided into a plurality of process sets, which function like artificial processing units. Said plurality of process sets is iteratively merged and reduced to the number of processing units without exceeding the balance load. Merger is based upon the value of a partition threshold, which is a measure of the memory utilization. The turnaround time and memory savings of the instant method are functions of the number of processing units available and the number of partitions into which memory is subdivided.

8 Claims, 2 Drawing Sheets

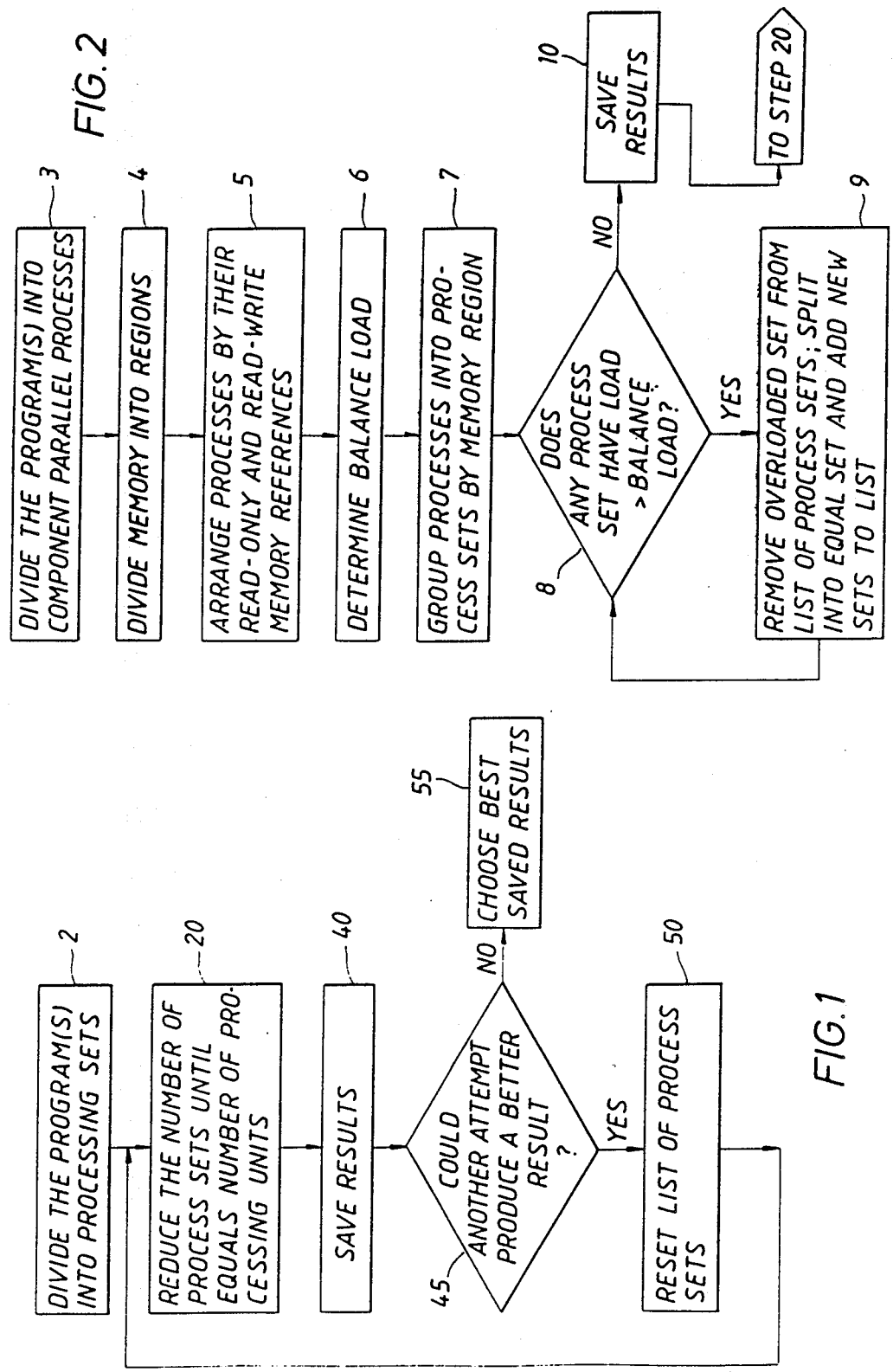

METHOD OF UP-FRONT LOAD BALANCING FOR LOCAL MEMORY PARALLEL PROCESSORS

ORIGIN OF INVENTION

The invention described herein was made by an employee of the United States Government and may be manufactured and used by or for the Government of the United States of America for governmental purposes without payment of any royalties thereon or therefor.

FIELD OF THE INVENTION

This invention relates to a method for distributing tasks among a plurality of processors, and more particularly relates to a method of uniformly distributing tasks among parallel processors whereby minimal memory is utilized by each processor.

BACKGROUND OF INVENTION

It is well known that most computer systems in current use consist of a single processor with concomitant memory and peripheral devices. Recently, however, multicomputer environments, consisting of the interconnection of multiple processors, have become available. In such environments, the computational tasks or loads are accomplished by distributing them across the available plurality of processors.

It is further known in the prior art that the preferable multicomputer operating environment is one in which parallel processing is performed. Generally, computer systems with parallel processors either have shared memory or dedicated memory. In shared memory computer systems, all of the available memory is shared among all of the parallel processors. Thus, the available memory is not associated with any individual processor but is a resource associated with the entire computer system On the other hand, in a dedicated memory computer system, the available memory is allocated to each individual processor. Each quantum of memory allocated to a processor is for that processor's exclusive use. No sharing between processors occurs.

Regardless of whether the memory in a parallel computer system is shared or dedicated for a particular process to be accommodated under this environment, its panoply of computational tasks must be subdivided into a set of parallel components. As is known to those skilled in the art, parallel components may be executed separately and independently of other parallel components. But as is further known to those skilled in this art, the subdivision of a process into parallel components is often a difficult task in itself. As an illustration, in U.S. Pat. No. 4,468,736, DeSantis, et al., disclose a method for decomposing a process into independent, disjoint tasks for parallel processing. Once the parallel components of a process have been established, it will become clear that they must be distributed among the processors of a multicomputer system to effectuate acceptable throughout.

The distribution or "balancing" of a multicomputer's load among its constituent processors may be referred to as "load balancing." Conventional load balancing methodologies have sought to allocate the various loads assigned to a multicomputer system by exploiting the architecture of a particular computer hardware configuration. This machine-dependency arises because the optimal distribution of tasks in a multicomputer environment may be achieved only by enumeration of all possible task configurations. Such enumeration is prerequisite to achieving the optimal balancing of tasks because the distribution of parallel tasks among a plurality of processors, like the traveling salesman and graph-partitioning problems, has been shown to be a member of the class of nondeterministic polynomial-time complete (NP-complete) problems. It is known to those skilled in the art that such NP-complete problems are intractable and defy analytical solution, as discussed by 0.1 El-Dessouki and W.H. Huen in the IEEE Trans., vol. C-29, no. 9, September 1980. pp. 818–825, in their article entitled "Distributed Enumeration on Between Computers."

In a parallel multiprocessor environment, the objective of load balancing is to distribute computational loads among these processors whereby each processor executes equivalent loads. Indeed, the more uniformly tasks are distributed among the processors, the more effectively the multicomputer system is executed because the processors are more likely to be actively performing computational tasks. This balancing is generally performed either statically or dynamically.

Static load balancing is conventionally used when the parallel computational components of a process can be completely ascertained prior to their execution. Dynamic load balancing is usually used when the attributes of the parallel computational components of a process vary over time, or when none of these attributes can be ascertained prior to execution.

For a multicomputer system with many tasks, the enumeration method of distributing tasks is clearly impractical and unmanageable. Accordingly, it is well known in the prior art that heuristic methods may be used to achieve a reasonable, albeit suboptimal, distribution of tasks as herein discussed. It is apparent in the prior art that to achieve optimal load balancing in a parallel processing environment requires a formidable expenditure of processing time. It is conventional to avoid these rigorous constraints by heuristically ascertaining a suboptimal load balance. Such a heuristic determination is achieved at a mere fraction of the system resource and without the hereinbefore mentioned information about the composition of the process load mix.

One such heuristic method known in the prior art is called "pipelining." This method is applicable to processes which can be subdivided into parallel processes which need minimal amounts of data. When the first available processor requests a load, a process and its concomitant data is pipelined thereto. As is known to those skilled in the art, this method is useful only if the computational time is longer than the time expended initiating the computation and communicating its results. It will become clear that if the contrary occurs, the processors tend to remain idle because too much time is expended on information flow.

Another method known in the prior art is called "vectorizing." This method is applicable to independent processes for which identical computations are performed. Multiple identical computations are performed on large arrays during each iteration, and each such iteration is uniformly distributed among the available processors.

Several methods and systems have been developed to improve the load balancing art. For example, Hartung, et al., in U.S. Pat. No. 4,633,387 teach a method of dynamic load balancing whereby work queues in a shared memory environment are examined to ascertain whether work-requesting thresholds have been met.

Similarly, Ruhman, et al., in U.S. Pat. No. 4,491,932 disclose a method to partition shared memory for distributing the loads of disjoint processes into a reconfigurable array. In U.S. Pat. No. 4,495,570, Kitajima, et al. discloses a method for dynamically distributing the loads in a dedicated memory parallel processing environment whereby a processing request allocator executes service requests based upon process waiting and delay times.

Typically, the load balancing methodology used must handle an arbitrary set of tasks. That is, no a priori information about the number or size of the tasks is known. However, in applications where task information is known a priori special methodologies incorporating the task sizes and respective interdependencies therein may be developed. An example of such an application might be a mail carrier who is assigned a maximum amount of letters and packages to deliver in a predefined geographical area. A similar example might be the delivery of packages by Federal Express wherein each truck is allocated a maximum number of "loads" which are delivered to predefined locations. Another application might be the mapping of billions of stars in a galaxy whereby each connection between the stars exhibits an identical operation.

Another example of a set of tasks whose sizes and interdependencies are known is a simulated neural network. Such a network consists of multiple, similar processes, whereby nodes, called neurons, are systematically interconnected via synapses. The neurons may be subdivided into groups which it will be seen execute in parallel. For a typical neural network, consisting of hundreds of neurons and thousands of connections, it has been difficult to effectively distribute the processing loads absent using the costly and time-consuming enumeration method.

In such a neural network where the processing at each node is identical, the prior art has been faced with two problems. The first problem is how to effectively deal with the large memory requirements of the network typically represented as arrays. The objective is for the processing units to perform the requisite calculations while utilizing minimal memory. The second problem is how to efficiently execute the myriad identical computations throughout the network. Since each node performs an action related solely to itself and to its interconnecting nodes one solution might be to allocate each node to a processor in a multicomputer environment. Each of these processors would execute the computations for one node in parallel with the computations executed by the other processors. It is apparent that this solution is impractical because multicomputer systems typically do not consist of hundreds of processors.

It is well known in the prior art that the typical multicomputer system consists of from four to one hundred processors. Accordingly, to efficiently process a neural network requires a method of grouping the myriad computations into subsets which can be distributed among the available parallel processors. The paper "Design of a Neural Network Simulator on a Transputer Array" by Gary McIntire, et al., presented at the Space Operations-Automation and Robotics Workshop at NASA / Johnson Space Center on Aug. 5-7, 1987, elucidates the nature of the problem and subsetting strategies.

As has been hereinbefore discussed, those skilled in the prior art are familiar with various static and dynamic methods which have attempted to distribute loads among parallel processors. For instance, the paper "Performance Tradeoffs in Static and Dynamic Load Balancing Strategies" by Ashraf Iqbal, Joel H Saltz and Shahid H. Bokhari, under NASA contracts NAS1-17070 and NAS1-18107, describes the limitations of various static and dynamic load balancing methods. None of the methods referenced therein, however, has sought to accomplish such distribution concomitant with the utilization of minimal memory.

SUMMARY OF INVENTION

The present invention provides a method to uniformly distribute the computational load of an artificial neural network, and the like, among the processing units of a multicomputer system while utilizing minimal memory.

The present invention subdivides the memory of a multicomputer system into a plurality of partitions, with each partition containing either read-only or read-write memory. The memory contained in a partition is not shared with any other partition in the computer system.

During the execution of each identical computation in the network, in which a finite number of machine cycles are executed, a process is performed which operates upon particular partitions of memory. The present invention collects these processes which operate upon the same regions of memory into packets.

In the preferred embodiment of the present invention, this memory-partitioning is represented by a two-dimensional array or grid with read-only memory positioned along one axis and read-write memory positioned along the other axis. Thus, each of the read-only and read-write memory is subdivided into partitions, depicted by rectangular regions in the array. Each such region represents one read-only partition and one read-write partition.

The preferred embodiment initially searches the process required for each connection of the network and enters the computational load for each such connection into the appropriate region of the array. After all of the processes have been entered into regions of the array, the corresponding packets are collected into process sets which function like artificial processing units. Thus, each processing set is initially allocated to a particular memory partition.

It is a feature of the present invention that these process sets are used to achieve a uniform distribution of the load whereby each processing unit receives an equally balanced load. This balance load corresponds to the quotient of the sum of the aggregate load of the network and the number of processing units.

It is an advantage of the present invention that each process set is guaranteed to be allocated at most the balance load. The initial number of process sets is usually substantially greater than the number of processing units, therefore it is necessary to repeatedly merge process sets until the number of process sets and the number of processing units become equal.

The purpose of the merging of process sets is not only to reduce the number of process sets to the number of processing units, but also to combine the process sets whereby the regions of memory involved in each merger are in close proximity to each other. Since the regions of memory are represented by a NxN array, it is a feature of the present invention that the merger is limited by the current partition threshold.

The partition threshold represents the acceptable proximity between regions in the array, for merger purposes. Thus, merging proceeds iteratively by combining processing sets without exceeding the balance load and by attempting to keep the partition threshold within a value prescribed for the current iteration. As will become apparent, each iteration starts with a prescribed partition threshold, and typically terminates with a higher value of the threshold.

This higher value of the partition threshold corresponds to a dynamic adjustment of the allowable merge proximity limits. If no merges or an insufficient number of merges occur at the current threshold value, the present invention increments the size of the partition threshold by one and then restarts the iteration. As will become apparent, each such iteration starts with the lowest partition threshold of 2, and is repeated with a successively higher threshold until the best threshold for the network has been found.

The lowest partition threshold which allocates the balance load among the process sets or, in actuality, the processing units, will correspond to load balancing requiring minimal memory. This improved distribution of load or load balancing is performed, in accordance with the present invention, once and only once, after which the multiple processes throughout the network may be independently executed exclusively by the processor assigned to them.

It is a feature of the present invention that the desired merger of process sets is guaranteed because the balance load is interrelated with the number of processing units.

Another important feature of the present invention is that the execution time to balance the load of an artificial neural network, and the like, is dependent only on the number of processing units contained in the computer system and the number of partitions into which memory is subdivided. Thus, this execution time is independent of the size of the network input.

Accordingly it is an object and feature of the present invention to provide a method to balance the load in an artificial neural network, and the like, wherein the computational load at each processing unit is uniformly distributed.

It is also an object of the present invention to balance the load in an artificial neural network, and the like, whereby minimal memory is utilized during the execution of the computational load apportioned to each processing unit.

It is a further object of the present invention to provide a method to guarantee a balanced load and minimal memory utilization in an artificial neural network, and the like.

It is a further object of the present invention to enable parallel multiprocessor computers to accommodate network configurations two to three times greater in size than would otherwise be accommodated.

It is still a further object of the present invention to enable network configurations to execute on parallel multiprocessor computers with only a fraction of the normal utilization of memory, particularly with only one third to one half of the memory normally utilized.

It is a specific object of the present invention to provide, in a parallel processing computer system including a plurality of processing units and shared memory, and containing a network having identical computations to be executed at each connection therein, and said network further having a constant aggregate computational load. a method of up-front load balancing comprising generating a first plurality of electrical signals with each such signal functionally related to a corresponding one of said identical computations in said network, generating a first electrical signal functionally related to the balance load in said network, generating a second plurality of electrical signals functionally establishing a preselected plurality of partitions of said memory, generating in response to said first and second pluralities of electrical signals, a first sequence of electrical signals functionally dividing said computational load into a plurality of process sets, generating in response to said first electrical signal and said first sequence of electrical signals, a second sequence of electrical signals functionally allocating said process sets among said memory partitions, and generating in response to said second sequence of electrical signals, a third sequence of electrical signals functionally merging said process sets until they are equal in number to said plurality of processing units.

These and other objects and features of the present invention will become apparent from the following detailed description, wherein reference is made to the figures in the accompanying drawings.

BRIEF DESCRIPTION OF THE DRAWINGS

FIG. 1 is a block diagram illustrating the operation of the main steps of the present invention.

FIG. 2 is a block diagram illustrating the operation of the steps of the present invention which divide the programs into process sets.

DETAILED DESCRIPTION

Figure 3:
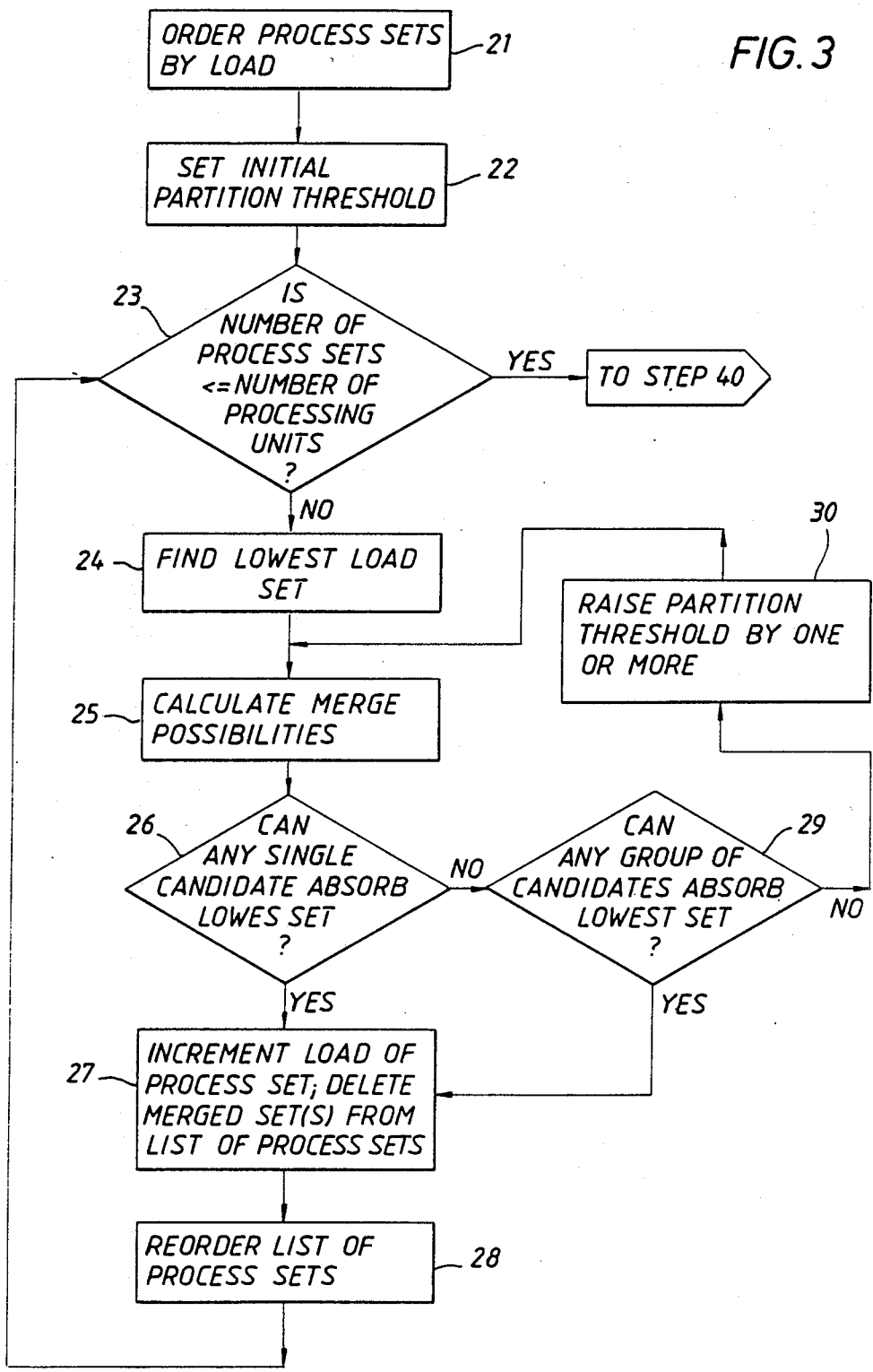
FIG. 3 is a block diagram illustrating the operation of the steps of the present invention which reduce the number of process sets to the number of processing units.

Referring now to FIG. 1, there may be seen the steps comprising the concept of the present invention. The programs, constituting the computational load of an artificial neural network, and the like, are arranged into process sets, at step 2. Each interconnection in such a network may be visualized as a from-to combination whereby information is sent from one node to another node. Thus, a from-to combination represents the flow of information between two nodes. Indeed, for information to flow through the network, all of the computational loads at each connection must be executed.

The present invention subdivides the memory of a multicomputer system into a plurality of partitions, with each partition containing either read-only or read-write memory. During the execution of a computation, instructions and source data are read from particular regions of "source memory." Data changed as a result of a computation is written to particular regions of "target memory." Thus, source memory is read but not changed, while target memory is changed.

Accordingly, in a preferred embodiment of the present invention, each memory partition is a disjoint subset of either the source or target memory. The memory contained in a partition is not shared with any other partition in the computer system. The total memory available to this system corresponds to the sum of all the source and target partitions which is equivalent to the sum of all source and target memory, which, of course, is in turn equivalent to the sum of all read-only and read-write memory.

During the execution of each identical computation in the said network, in which a finite number of machine cycles are executed, a process is performed whereby source memory and target memory are operated upon as hereinbefore described. The present invention collects these processes, which operate upon the same regions of memory, into process sets of "packets" and merges them together to achieve the dual purpose of uniformly distributing the aggregate load and reducing memory utilization. This improved distribution of load or load balancing is performed, in accordance with the present invention, once and only once, after which the plurality of processes throughout the network may be independently executed exclusively by the processing unit assigned to them.

It is common for those skilled in the prior art to depict memory-partitioning by a two-dimensional array or grid. Accordingly, the partitioning of total memory, under the concept of the present invention, is represented by a two-dimensional array with source memory positioned along the vertical axis and target memory positioned along the horizontal axis. Thus, each of the source and target memory is subdivided into partitions, depicted by rectangular regions in the array. It will become apparent that each such region represents one source partition and one target partition.

At step 20, the number of process sets is reduced until the number of processing units and the number of process sets is equal. At step 40, the results of step 20 are saved for possible later use. Step 45 determines whether another cycle could produce a better result, namely uniformly distribute the load among the processing units with a lower memory partition threshold.

The partition threshold, in accordance with the concept of the present invention, is the indicia of the area in the memory partition array which may be assigned to each processing unit. Stated alternatively, the partition threshold represents the number of regions, and the proximity thereof to each other, for which each processing is responsible. Thus, a lower partition threshold is "better" than a higher threshold value because a lower value means that fewer regions of memory are prerequisite for the execution of the computations assigned to a particular processing unit.

Again referring to FIG. 1, if a lower partition threshold can be achieved by executing another cycle, step 50 resets the list of process sets to the results of step 2 and restarts the cycle at step 20. If a lower partition threshold cannot be achieved from executing another cycle, step 55 selects the lowest partition threshold from the results saved from step 40.

Referring now to FIG. 2, there may be seen, in greater detail, the methodology which arranges the computational load into process sets, depicted in FIG. 1 as step 2. The computational load is subdivided into component parallel processes at step 3. For a neural network, of course, the identical, parallel processes for each connection between neurons are known a priori. Accordingly, in the preferred embodiment of the present invention, these parallel processes are contained in an input file.

At step 4, the read-only and read-write read from another input file and total memory is subdivided into $N^2$ regions, whereby a load array of NxN regions is created. While N may be selected arbitrarily, it has been empirically ascertained that an approximate starting value calculated as the nearest integer greater than the square root of twice the number of processing units is preferred. For example, in a computer system with forty processors. the "nearest" integer square root to twice forty, i.e., eighty, is nine, since nine is the square root of eighty one. Thus, N may either be calculated from the number of processing units or input as an overriding value.

Once the size of the array is established, at step 5, the computational load required at each connection in the network is read. Each Load is placed into the load array based upon the connection's read-only and read-write memory references. More particularly, an Integer-Distribute routine is invoked to determine the range of read-only or source memory encompassed by the corresponding source-indicies of the load array. Similarly, the Integer-Distribute routine is then invoked again to determine the range of read-write or target memory encompassed by the corresponding target-indicies of the load array. The steps comprising the Integer-Distribute routine are given in Table 1.

TABLE 1

Integer-Distribute Routine

| Step | Description |
|---|---|
| a | TOTAL = total number of elements to be distributed |
| b | N = number of chunks into which TOTAL must be subdivided |
| c | L = list of chunks returned |
| d | Set BASE = TOTAL / N |
| e | Set LEFTOVER = TOTAL − (BASE × N) |
| f | Make list L, N units long, each unit with a SIZE of BASE number of elements |
| g | Determine if LEFTOVER is equal to zero |
| h | If LEFTOVER is equal to zero, return |
| i | If LEFTOVER is not equal to zero, find the first unit of list L with size of BASE |
| j | Set unit SIZE = BASE + 1 |
| k | LEFTOVER = LEFTOVER − 1 |
| l | Go to step g |

If there is more input, the next computation is and stored into the load array based upon its source and target memory references. The cumulative load is then incremented by the value of this load. Accordingly, all of the input is stored into the appropriate locations in the load array. When this load array initialization is completed, at step 6, the balance load is ascertained from the quotient of the cumulative load and the number of processing units. Since fractional balance load is not permitted, the balance load is rounded to the next higher integer value.

Still referring to FIG. 2, at step 7, the computational loads are grouped into process sets based upon the region of memory in which their packets are contained. First, an array for holding the memory partitions, a partition array, is created with the same NxN dimensions as the load array. Then for each region in the load array the load is tested for a zero value. If the value of the load for a particular region is zero, the next region in the load array is tested. If the value of the load for a particular region is nonzero, the packet is added to a list of process sets.

This value of the load is compared with the value of the balance load, at step 8. If the load is less than the balance load, the region of the partition array corresponding to the current region of the load array is set equal to the list of packets for the said region of the load array. If the load is not less than the balance load, this overloaded process set is deleted from the current list of process sets, at step 9, and then the Integer-Distribute routine is invoked to propagate packets of equal load obtained by taking the quotient of the particular load and the balance load.

Still at step 9, the newly created process sets are added to the current list of process sets. The process set to which each packet belongs is recorded. Steps 8 and 9 are repeated for each region of the load array and a corresponding entry is written into the partition array. After all of the regions in the load array have been read, at step 10, a copy of the partition array is saved for resetting purposes.

Referring now to FIG. 3, there may be seen, in greater detail, the methodology which reduces the number of process sets to be equal to the number of processing units, depicted in FIG. 1 as step 20. At step 21, the process sets are sorted by load and placed into a list. The preferred embodiment of the present invention uses an insert sort which is well known to those skilled in the art. The insert sort is described in *The Design and Analysis of Computer Algorithms*, written by A.V. Aho, J.E. Hopcroft and J.D. Ullman, and published by Addison-Wessley in 1974. It should be clear that a variety of sort algorithms are known in the prior art and may be used in the present invention.

Still referring to step 21, the initial partition threshold is set to its lowest value of 2. Next, at step 22, the number of process sets is compared with the number of processing units. If the number of process sets is less than or equal to the number of processing units, then the results are saved in step 40 of FIG. 1. If, as usual, the number of process sets is greater than the number of processing units, then as shown in step 23, the process set with the lowest load is found in the list of process sets Once found, this lowest load process set is deleted from the list of process sets, and then subdivided into multiple process sets, one for each packet. Each such process set, which has a load equal to the load of its packet, is off-loaded by attempting merging with the other process sets in the said sorted list.

More particularly, in step 24, each of these subdivided process sets created from the lowest load process set, is attempted to be off-loaded by being merged with the other process sets. Using the list of packets contained in the partition array, a search is made for a packet in the partition array which shares the same source and target partitions as the process set to be off-loaded. but belongs to a different process set. At step 25, it is determined if such a packet has been located in the partition array. If there is such a packet, as much load as possible is off-loaded without exceeding the balance load, at step 26. At step 28, it is determined if there is any residual load in the process set being off-loaded.

If there is residual load in the process set being off-loaded, then a set of merge candidates is sought. These merge candidates are chosen from all of the other process sets which have a load less than the balance load. For each candidate, merger with the residual load is attempted. For process sets which do not exceed the balance load, the partition-sum of the potential merger is calculated by adding one for every unique source and target memory partition in the combined process set. If any of the trial mergers exceed the partition threshold for a process set, they are discarded.

The surviving set of merge candidates corresponds to all of the process sets which can off-load all or part of the residual load without exceeding the balance load. From this surviving set, the merge candidate which has the most partitions in common with the set to be off-loaded is chosen. To promote this choice being made, the set is sorted by ascending load and by ascending difference in partitions. If there are no candidate sets satisfying this criterion, then any combination of candidate sets are chosen which collectively can off-load the residual load, provided that the said collection of sets have the most partitions in common with the residual process set. The steps comprising the Combine routine are given in Table 2.

TABLE 2

| Step | Combine Routine Description |
| --- | --- |
| a | A = set to off-load via merger |
| b | B = set to be combined with A |
| c | Delete B from list of process sets |
| d | Set "owner" of packet of A = B |
| e | Add packets of A to list of packets of B |
| f | Resort B by load into list of process sets |

If however, thoro is no combination of candidate process sets which can affect the off-loading without exceeding the partition threshold, the threshold is increased by one, at step 29, and the merge procedure, starting at step 24, is repeated.

As is apparent to those skilled in the art, once the process sets participating in this merger operation have been identified, they are deleted from the list of process sets, at step 28. At step 27, the remaining list of process sets is again sorted by load using an insert sort as hereinbefore discussed at step 21. Hence, only the new process sets are actually sorted.

Referring again to FIG. 1, at stop 45, for each iteration which commences with a particular partition threshold and ends with another, higher partition threshold, another iteration is performed with the starting partition threshold incremented by one. This cycle continues until it is clear that another attempt cannot yield a lower ending threshold. At step 55, the best answer is obtained from the saved results in step 40.

It should be clear to those skilled in the art that the present invention finds an approximate solution to a difficult and formerly intractable problem.

It will be shown that the maximum execution time for the present invention is linearly related to the size of the input for the initialization phase in which the load and partition arrays are established. It will further be shown that an unexpected advantage of the preferred embodiment is that the execution time for the remainder of the method taught by the present invention is independent of the size of the input.

As hereinbefore described in detail, the preferred embodiment of the present invention uses an iterative merging of process sets using a starting value of the partition threshold. The partition threshold is used as the indicia of the memory required for execution of each identical computation by the processing units. After each iteration, the list of process sets has been reduced and reset accordingly. The initial partition threshold is then incremented, and another iteration made.

It should be clear that the partition threshold concept of the present invention functions as a guide for merging process sets. More particularly, it guides which process sets should be merged with the process set being off-loaded, by focusing on the total partition area which would be in effect after the purported merger. The present invention has an inherent bias against the partition threshold being exceeded during the merger phase. If, however, no merges are possible for a particular partition threshold, then the partition threshold must be incremented for merging to occur.

The lower the partition threshold, the lower the partition area occupied and the more compact the resulting combined process sets will be. However, a lower partition threshold means that the merging phase is more constrained. Thus, merges which occur prior to the partition threshold being incremented may be passing up merge opportunities which could produce a more optimal overall reduction in memory. The goal is to select an initial partition threshold which allows all merges to occur without having to increment the threshold value during the iteration.

Since the optimal partition threshold is not known a priori, the preferred embodiment is executed multiple times with progressively higher threshold values. The iteration in which the final partition threshold and the initial partition threshold are the same, terminates execution and yields the best load balancing solution. As has hereinbefore explained, this solution includes a uniform distribution of the computational load among the processing units, with minimal (albeit suboptimal) memory being utilized by these processing units.

After the iteration in which the final partition threshold and the initial partition threshold are the same is reached, no subsequent iterations will produce an environment which is less constrained. Since the partition threshold was unchanged, all attempted merges were effectuated during that iteration.

Of course, for iterations in which no merges or an insufficient number of merges can occur, the present invention increments the partition threshold by one and then restarts the current iteration. This incremented value of the partition threshold corresponds to a dynamic adjustment of the allowable merge proximity limit. Clearly, lower partition threshold values prelude merges for memory regions containing packets which are too far apart. On the other hand, higher partition threshold values allow merges between process sets which contain packets contained in regions which are far apart, thereby utilizing too much memory.

To arrive at an estimate of the operating time of the preferred embodiment, the reduction and resetting times as well as the number of prerequisite iterations must be determined. For the operation of the preferred embodiment in a given application environment, the number of processing units and the number of partitions are constant.

As hereinbefore stated, the recommended value of the number of partitions is approximately the square root of twice the number of processing units. Thus, the execution of the preferred embodiment is optimal when the NxN size of the array is approximately twice the value of the number of processing units.

As an example, for a computer system with four processing units, the recommended number of partitions for each of read-only and read-write memory, is three. This, of course, corresponds to a 3×3 array of nine regions. For computer systems with processing units of eight and twelve, the recommended number of partitions for each of read-only and read-write memory are (our and five, respectively. As still another example, the recommended number of partitions for a computer system with forty processing units is nine .

The greater the number of partitions used in the preferred embodiment the more choices there are for the merging of process sets. However, the greater the number of partitions, the longer the execution time. The selection of the number of processing units, of course, depends upon the available hardware resources and economic constraints. The selection of the number of partitions depends upon the importance of turnaround time in the particular operating environment. Once the number of processing units and the number of partitions have been chosen, the time required to execute the load balancing method of the present invention depends only thereon.

As hereinbefore described, the initialization procedure generates as least one process set for each nonzero region of the load array. Accordingly, if none of the N partitions has a zero load, the maximum number of process sets is $N^2$. However, when the loads of the partitions are unequal, some of the partitions may contain multiple process sets. Since the balance load is calculated using the number of processing units, P, as the divisor, it is clear that the worst distribution would generate P-1 remaining process sets. Stated alternatively, the worst distribution, i.e., the distribution with the largest result, would be found by taking the modulus with respect to P. Such distribution is $P-1$. Anything larger yields the same or a smaller number of process sets with a larger balance load. Hence, the maximum number of initial process sets is $N^2+p-1$.

The novel reduction phase of the preferred embodiment reduces the initial list of process sets to the number of processing units. Since the initial list cannot be longer than $N^2+P-1$, the number of merges is represented by $(N^2+P-1) -P$ or $N^2-1$. As hereinbefore described in detail, each merge involves searching all other process sets which is limited by the lemgth of $N^2+P-1$. It is thus clear that the total time mecessary to reduce the list of process sets to length P is $(N^2-1) \times (N^2+P-1)$.

Now consider the time necessary to reset the list of process sets after each iteration. The maximum length of the list is $N^2+P-1$. To arrive at the maximum number of iterations, it should be clear that an iteration with either the lowest partition threshold of one or the highest partition threshold of 2N, is unnecessary. This is, of course, because the number of partitions must be at least two and the total number of partitions is 2N. Hence, the maximum number of iterations is $2N-2$ and the total time required for the balancing iteration is obtained thus:

$$[(N^2 - 1) \times (N^2 + P - 1) + (N^2 + P - 1)] \times (2N - 2)$$

$$(N^2) \times (N^2 + P - 1) \times (2N - 2)$$

which is clearly a function of only the number of partitions, N, and processing units, P. The present invention has the important advantage that regardless of the size of the network, the execution time required to balance the loads during the merger phase remains constant for a given multiprocessor configuration.

Empirical results indicate that the execution time of the preferred embodiment is significantly below the $(N^2) \times (N^2+P-1) \times (2N-2)$ maximum. This is because the number of iterations actually required to achieve a balance load is typically Less than $2N-2$. Most configurations are indeed balanced within only one third of the maximum possible iterations. That is, within, one third of the maximum iterations, a sufficiently low partition threshold is achieved whereby further iterations are unnecessary.

For example, if a fourth iteration were to yield a partition threshold of six, continuing past the fifth iteration would be fruitless because a lower threshold value would be impossible. Furthermore, an iteration is aborted by the preferred embodiment if, during execution, the partition threshold is raised above the current best value. The partition threshold represents the extent to which memory will be prerequisite for the execution of the computational load by the processing units.

As should be clear, memory saved by the present invention is measured by the final partition threshold. As an illustration, consider a computer configuration for which each of read-only and read-write memory are subdivided into ten partitions. If the final partition threshold achieved is five, and since total memory consists of twenty partitions, then the memory savings is calculated thus: $1-5/20=75\%$. Instead of each processing unit requiring up to all of memory for execution of its allocated computational load, only an equal fraction of the load is borne by each processing unit in no more than five partitions of memory.

In approximately fifty test cases of typical artificial neural networks the preferred embodiment yielded memory savings of sixty to seventy five percent of the runs. Most of the configurations in these test cases consisted of forty processing units and twenty total partitions of memory, i.e.. ten partitions of read-only and ten partitions of read-write memory. For those cases in which an optimal solution could be independently obtained via the enumeration method, the load balancing method of the preferred embodiment deviated only fifteen percent from the optimal solution. Accordingly, the present invention enables networks two to three times larger than would otherwise be possible to be executed on a computer system.

As hereinbefore described, the execution time of the present invention increases with the number of partitions. Yielding a more optimal reduction in memory with larger number of partitions, the present invention affords a trade-off between turnaround time and memory reduction. As an example, consider the empirical results obtained from runs of an artificial neural network with 160 nodes and 6,000 connections operating on a computer system with forty parallel processing units. In the run in which memory was subdivided into ten partitions, memory reduction of 74% was achieved by the preferred embodiment in 7.5 seconds. By contrast, in the run in which memory was subdivided into twice as many partitions, memory reduction of 87% was achieved in 4 minutes, 7 seconds. Thus, an increased memory reduction of 17% was obtained by doubling the number of partitions from ten to twenty, but the turnaround time was increased by several orders of magnitude.

Other variations and modifications will, of course, become apparent from a consideration of the features and steps hereinbefore described and depicted. Accordingly, it should be clearly understood that the present invention is not intended to be limited by the particular features and steps hereinbefore described and depicted in the accompanying drawings, but that the concept of the present invention is to be measured by the scope of the appended claims herein.

I claim:

1. In a parallel processing computer system including a plurality of processing units and shared memory, and containing a network having identical computations to be executed at each connection therein, and said network further having a constant aggregate computational load, a method of up-front, load balancing comprising generating a first signal representative of said plurality of processing units in said network, generating a first plurality of signals with each such signal representing a corresponding one of said identical computations in said network, generating in response to said first signal and said first plurality of signals a second signal representing a balance load in said network, generating a second plurality of signals functionally establishing a preselected plurality of partitions of said memory, generating in response to said first and second pluralities of signals, a first sequence of signals functionally dividing said computational load into a plurality of process sets, generating in response to said second signal and said first sequence of signals, a second sequence of signals functionally allocating said process sets among said memory partitions, and generating in response to said second sequence of signals, a third sequence of signals functionally merging said process sets until they are equal in number to said plurality of processing units.

2. The method described in claim 1, wherein said merging of said process sets includes comparing each signal of said third sequence of signals to said second signal to detect whether said balance load is exceeded.

3. The method described in claim 2 wherein said merging of said process sets includes generating a third signal functionally related to a preselected partition threshold.

4. The method described in claim 3, wherein said merging of said process sets includes generating in response to said third signal, a fourth signal functionally related to a current partition threshold.

5. The method described in claim 4, where said merging of said process sets further includes generating a fifth signal functionally related to the difference between said third signal and said fourth signal to detect whether said preselected partition threshold differs from said current partition threshold.

6. The method described in claim 5, wherein said merging of said process sets includes increasing in magnitude said fourth signal by an amount functionally related to incrementing said current partition threshold by a preselected amount.

7. The method described in claim 1 including generating a fourth sequence of signals functionally ordering said plurality of process sets by ascending computational load.

8. The method described in claim 7 further including comparing said fourth sequence of signals to said third and fourth pluralities of signals functionally ascertaining which computational loads to merge together.

* * * * *